United States Patent
Kikinis et al.

(10) Patent No.: US 7,412,716 B2
(45) Date of Patent: Aug. 12, 2008

(54) METHOD AND SYSTEM FOR ENABLING VISITORS TO SUBSCRIBE TO CURRENTLY-VIEWED PROGRAMMING PACKAGES

(75) Inventors: Dan Kikinis, Saratoga, CA (US); Gene Feroglia, Los Altos, CA (US); Yakov Kamen, Cupertino, CA (US); Brian Kimball, Burlingame, CA (US)

(73) Assignee: JLB Ventures, LLC, Washington, DC (US)

( * ) Notice: Subject to any disclaimer, the term of this patent is extended or adjusted under 35 U.S.C. 154(b) by 1240 days.

(21) Appl. No.: 10/179,713

(22) Filed: Jun. 24, 2002

(65) Prior Publication Data
US 2003/0014546 A1 Jan. 16, 2003

Related U.S. Application Data

(60) Provisional application No. 60/301,089, filed on Jun. 25, 2001, provisional application No. 60/301,087, filed on Jun. 25, 2001.

(51) Int. Cl.
*H04N 5/445* (2006.01)
(52) U.S. Cl. .......................................... 725/38
(58) Field of Classification Search ................ 725/23, 725/38, 87, 104; 705/14
See application file for complete search history.

(56) References Cited

U.S. PATENT DOCUMENTS

| | | | | |
|---|---|---|---|---|
| 6,002,394 A | * | 12/1999 | Schein et al. | 725/39 |
| 6,684,400 B1 | * | 1/2004 | Goode et al. | 725/61 |
| 2005/0251827 A1 | * | 11/2005 | Ellis et al. | 725/47 |

* cited by examiner

*Primary Examiner*—Christopher Grant
*Assistant Examiner*—Oschta Montoya
(74) *Attorney, Agent, or Firm*—Banner & Witcoff, Ltd.

(57) ABSTRACT

Methods and systems for enabling users visiting a friend or family member to subscribe to a TV programming package that the friend or family member currently subscribes to. In one embodiment, the method includes generating a user-interface (UI) via the friend's set-top box to enable entry of visitor user identification information. This information, along with programming identification information is then sent to the service provider for the programming package. The service provider retrieves or generates information by which a UI may be generated to easily enable the visitor to setup and activate the programming package and sends it to the visitor's home set-top box. In another embodiment, programming package identification information is stored on a portable storage medium and carried to the visitor's home set-top box, where it is read to retrieve the identification information. The information is then sent to the service provider, which sends back appropriate data to generate the UI.

26 Claims, 6 Drawing Sheets

METHOD AND SYSTEM FOR ENABLING VISITORS TO SUBSCRIBE TO CURRENTLY-VIEWED PROGRAMMING PACKAGES

RELATED APPLICATIONS

The present application is based on provisional applications entitled "CUSTOMER SELF SERVICE IN INTERACTIVE TV ENVIRONMENT FOR TV PROGRAMMING PACKAGES," Ser. No. 60/301,087, and "FRIENDS AND FAMILY PROGRAM FOR TV PROGRAMMING PACKAGES," Ser. No. 60/301,089, both filed on Jun. 25, 2001, the benefit of the filing date of which is claimed under 35 U.S.C. § 119(e).

FIELD OF THE INVENTION

The field of the invention relates generally to broadcast reception equipment, and more specifically but not exclusively relates to interactive television environments and set-top boxes and the like that are used to support such environments.

BACKGROUND INFORMATION

Often when a visitor comes to the home of a friend or family member to watch television programming, he may see that the friend or family member's programming package offers certain features, or channels, or shows that the visitor does not have. Under the current art of interactive programming guides (IPGs) for television viewing, a visitor would have to ask the friend or family member how to get these options that he does not have, record the information, and then call the programming provider's call center to inquire about obtaining such options. The creates a lot of work, and does not provide any guarantee that the visitor will end up with the same package, since he might not originally record all or appropriate information for identifying the programming package. Accordingly, what is clearly needed is a mechanism that would assist a visitor in signing up for a programming package, whereby the user would not need to record any information or call any call centers.

SUMMARY OF THE INVENTION

In accordance with aspects of the present invention, methods and systems are disclosed for enabling users visiting a friend or family member to subscribe to a TV programming package that the friend or family member currently subscribes to. In one embodiment, the method includes providing a user-interface via a first (i.e., the friend's) set-top box to enable entry of visitor user identification information. This information, along with programming identification information is then sent to the service provider for the programming package. Upon receiving the information, the service provider retrieves or generates information by which a user-interface may be generated to easily enable the visitor to setup and activate the programming package and sends it to the visitor's home set-top box, which generates the user-interface. In another embodiment, a user-interface is provided to enable the visitor to store the programming package identification information on a portable storage medium, such as a smart card, CD-ROM, or DVD. The portable storage medium is then carried to the visitor's home set-top box, where it is read to retrieve the stored information. The information is then sent to the service provider, which then sends back appropriate data by which the user-interface to enable the visitor to setup and activate the programming package can be generated.

In accordance with another aspect of the invention, the methods provide a mechanism for marketing programming packages by enabling service providers to compensate users for referrals. For example, information identifying a friend user (or from which the friend user can be identified, such as user machine information) is sent along with the visitor user and programming package identification information to the service provider. The service provider can then determine where the request to subscribe to the new programming package originated, and compensate the friend user.

According to other aspects of the invention, the methods may be implemented via software running on the systems, which will typically comprise a set-top box or the like. In general, the software may be provided with the set-top box, or downloaded from a broadcast service provider or third party via a communication interface built into the set-top box.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein like reference numerals refer to like parts throughout the various views unless otherwise specified.

DETAILED DESCRIPTION OF PREFERRED EMBODIMENTS

Embodiments of methods and systems for enabling users visiting friends or family members to subscribe to TV programming packages the friends or users currently subscribe to are described herein. In the following description, numerous specific details are set forth to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Figure 1:
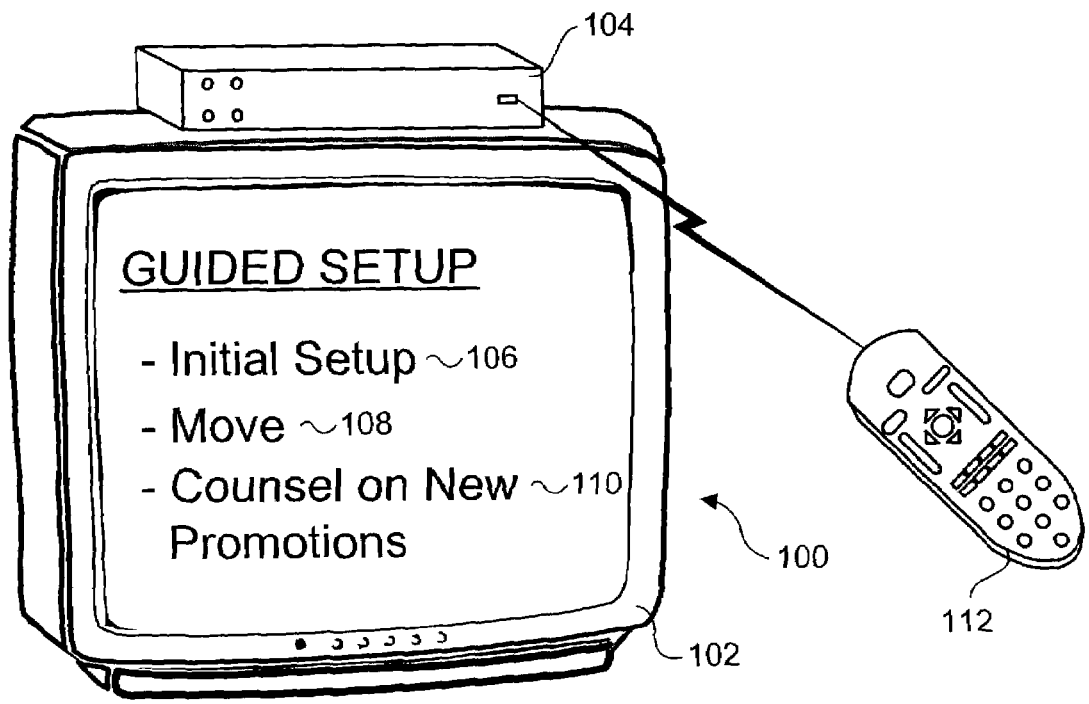
FIG. 1 is a representation of a display window corresponding to an initial interactive screen from which a user may select various self-service operations.

FIG. 1 shows a screen 100 displayed on a television 102 that is typical of what may be presented to a user while performing set-up operations pertaining to an interactive television device, such as a set-top box 104. Screen 100 has, for example, guided set-up options, such as an "Initial Setup" option 106, a "Move" option 108 (to help the customer change service when, for example, he moves to another address), and a "Counsel on New Promotions" option 110, which the customer might desire to access if he sees advertisements for new packages and he's interested in learning more about them and seeing if any of the new packages are more appropriate for him than his existing package. Generally, the user will navigate to various screens and select menu options using an input device such as a remote control 112.

In general, the processes described herein will be enabled through software running on a set-top box. Depending on the implementation, a particular process may comprise ongoing interaction with a broadcast service provider service center in a matter somewhat akin to a client-server operation, or may comprise collecting various information from the user, and then submitting the information to the broadcast service provider. In the first case, the set-top box will need to be connected to the broadcast service provider service center prior to initiating the process. In the second case, a similar connection may not be required to be initiated until some point after the process begins. Accordingly, since the operation of connecting to the broadcast service provider may apply at various stages of the processes describe herein, this operation is not shown in the drawing figures; however, such a connection operation is implied to occur during the processes, when and if applicable.

Figure 2:
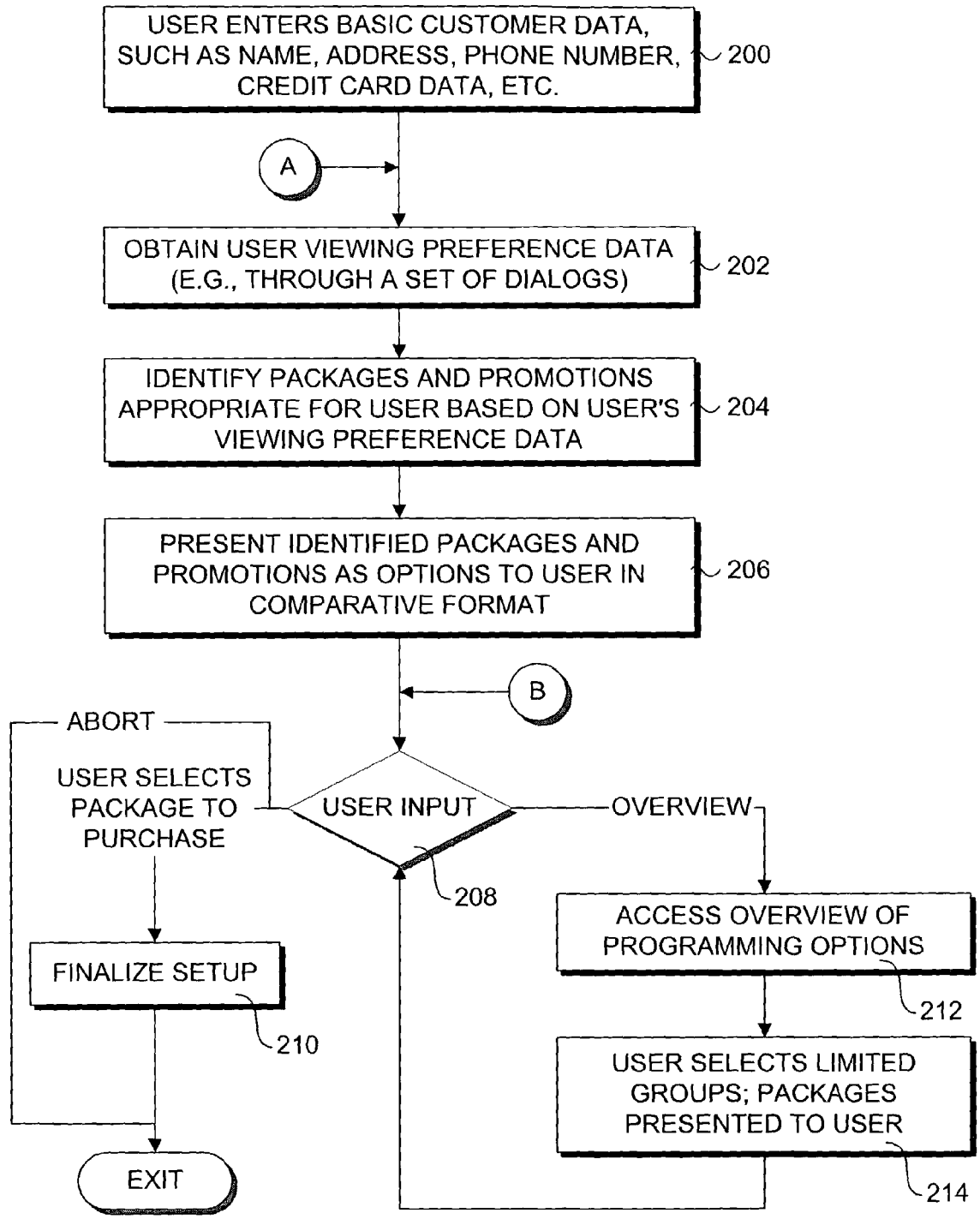
FIG. 2 is a flow diagram illustrating operations and logic implemented by the system to enable a user to set-up broadcast service access via a set-top box.

A flow diagram corresponding to an initial set-up process in accordance with one embodiment of the invention is shown in FIG. 2. This process begins in a block 200, in which the user will enter basic customer account data, such as name, address, phone number, credit card data, etc. After entering the customer account data, the user will be presented with a set of screens or dialogs in which the user will select viewing preferences, as depicted by a block 202. For example, the viewing preferences may include questions covering broad viewing categories, such as what general types of content the user prefers (e.g., movies, sports, news, etc.) and more particular questions pertaining to selected categories, such as what types of movies the user prefers. In a block 204, the user preference data is processed and viewing packages and/or promotions that are most appropriate for the user are identified based on the user preference data. The user is then presented with the identified packages and/or promotions in a block 206. In one embodiment, the packages and promotions are displayed in a comparative format, wherein the features and costs of the various options are displayed in a manner that enables the user to compare costs and features relatively easily. For example, the various packages and promotions may be presented in a comparison table, with bubbles or the like hailing certain advantages of one package over another.

At this point, the user is enabled to select various options, as depicted by a user input decision block 208. Under one case, the user selects one of the listed packages or promotions to activate. In response, final setup operations are performed in a block 210. For example, the final setup may include receiving an authorization code to enable the selected package to be accessed via the set-top box, or may include final authorization for charges, etc. After the final setup operations have been performed, the process is completed, as indicated by the "Exit" block in the figures.

Under another case, the user may select an overview option, whereby the user may access a total overview of all programming options, as depicted by a block 212. Depending on the complexity and number of options, this information may involve displaying information pertaining to one or more groups of programming packages via one or more interactive screens. From this navigation point, the user may "drill-down" to obtain further details on selected packages and the like. For example, the user might make a limited selection of packages in various different groups and have those packages presented to him in accordance with a block 214, in a manner similar to the comparison of packages in block 206 discussed above.

In general, the user will be able to navigate among various screens via well-known navigation techniques, such as activation of on-screen buttons and/or using navigation buttons on a remote control that are configured for such purposes. These techniques are well-known in the art, and accordingly, further details are not disclosed herein. Included among the operations is an abort option, which will enable the user to abort a particular operation, or the set-up operation itself.

Figure 3:
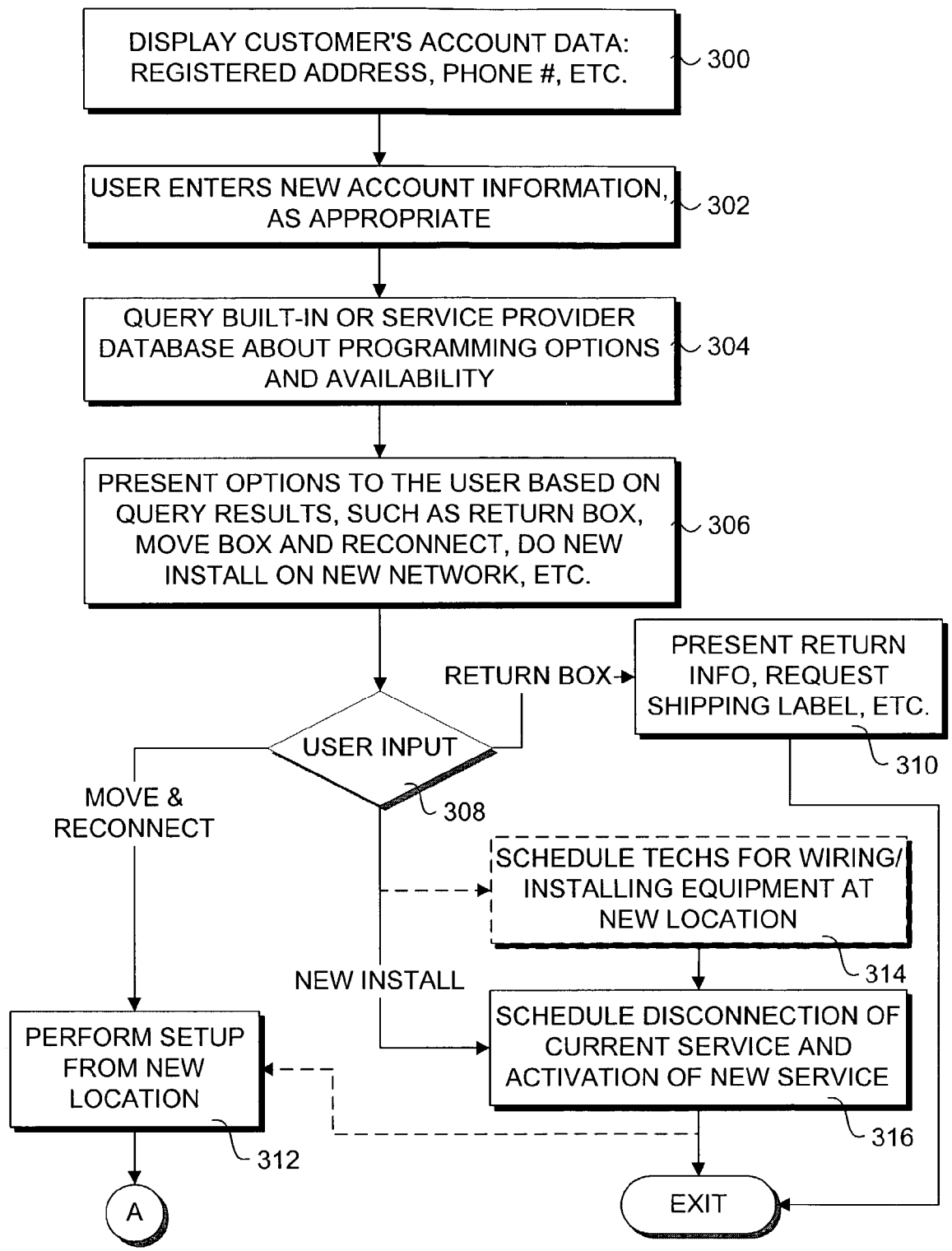
FIG. 3 is a flow diagram illustrating operations and logic implemented by the system to assist a user who is moving.

A flow diagram corresponding to a process that is initiated in response to selection of "Move" option 108 on screen 100 is shown in FIG. 3. In a block 300, the user is presented with current account data, such as registered address, phone number, etc. In general, this may require the set-top box to establish a communications link with the service provider service cent, whereupon the account data are retrieved from a database hosted by the service center. Optionally, such information may be maintained on the set-top box itself. In a block 302, the user enters new account information, as appropriate. For example, the user will usually enter a new address and phone number, although in some instances the phone number will remain the same. Upon completing entry of the new information, the user will activate an "update" button or a similar navigation element to update the user's account information.

In response to entry of the new account information, a query will be performed to determine the available programming options corresponding to the new location. In one embodiment, this query may be performed using programming package data that are stored on the set-top box itself. For example, such data may be provided with the set-top box and/or downloaded to the set-top box on a periodic basis. In another embodiment, the query will be performed against data in the service provider's database, with the results of the query forwarded to the set-top box via the communication link with the service provider service center.

Once the query is performed, corresponding navigation options are presented to the user in a block 306. For example, the options might indicate that the user must return the box (if no service is available at the new location), or enable the user to move the box and reconnect to using a current service. Another option might correspond to performing a new installation on a new network.

In response to a user input corresponding to a selected option, as depicted by decision block 308, corresponding operations will be performed. For instance, in response to selecting a return box option, the user could be presented with a dialog box that provides a return address or phone number to call to have the unit picked up, as depicted by a block 310. Optionally, the interface might enable a user to select to have a prepaid shipping label sent to the user, whereby the user could ship the unit back to the service provider. In response to a "Move and Reconnect" option, the user might be presented with a series of screens to enable the user to set-up the set-top box at the new location, as depicted by a block 312. These operations might further include some or all of the set-up operations discussed above with reference to FIG. 2, as depicted by the encircled "A's" in FIGS. 2 and 3, which illustrate a "jump-to" operation.

If the user selects a new installation option, there are several activities the user may be required to have performed prior to activating a service. For example, if the new location isn't wired for cable or satellite service, the user may be provided with one or more screens via which the user could schedule a service technician to install any necessary equipment. These activities are depicted by a block 314, wherein the dashed lines indicate the activities are optional. As shown in a block 316, the user may also be presented with screens to enable the user to schedule disconnection of a current service and activation of the new service.

As discussed above, the navigation scheme enables users to jump to other screens and processes, as appropriate, using well-known navigation techniques. For example, the user could navigate to a screen corresponding to block 312 after scheduling disconnection of a current service.

Figure 4:
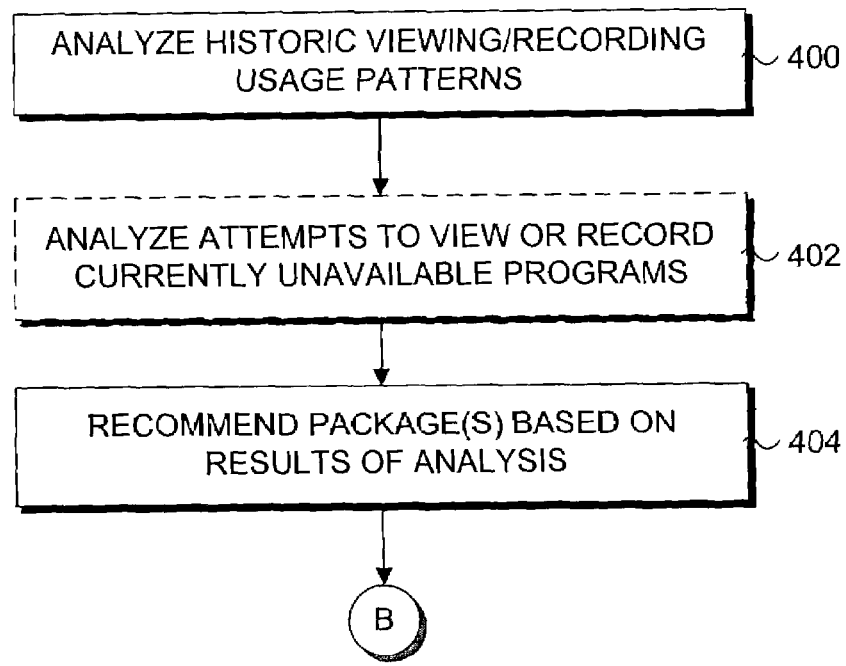
FIG. 4 is a flowchart illustrating operations implemented by the system to assist a user in selecting an appropriate programming package based on historic usage information.

A flow diagram corresponding to a process that is initiated in response to activation of "Counsel on New Promotions" option 110 is shown in FIG. 4. Typically, a customer may select this option after having seen a promotion offering a new programming package, or the customer may be prompted through an interactive ad to review his current subscription versus his actual usage pattern. In a block 400, the customer's historic usage pattern is analyzed. For example, a use-tracking program may be implemented on the set-top box to track the user's viewing habits. In general, such information is used to reveal viewer preferences based on observed usage. For example, a record of the amount of time a user spends watching various channels might be kept. In another embodiment, each program might have some type of content identifier (such as sports, news, drama, comedy, etc.), and the tracking information could contain an aggregation of time spent viewing content corresponding to each category.

In addition to tracking actual viewing usage, it might also be valuable to track attempts to access unavailable programming. For example, many electronic program guides (EPGs) provide details of scheduled content broadcast by a corresponding service provider. Typically, the listed content (e.g., television shows, movies, etc.) may include content corresponding to the most comprehensive programming packages available from the service provider, such as including content that will be broadcast over all of the stations supported by the service provider. As a result, some of this content will not be available for viewing or recording in situations in which the user doesn't subscribe to a programming package that includes the originating channel the content is broadcast over. For example, a user may attempt to view or record a program on a premium channel not included in the user's current programming package.

In accordance with this consideration, in one embodiment such attempts to access unavailable programs are analyzed in a block 402. In a block 404, one or more packages are recommended to the user based on the analysis' performed in block 400 and optional block 402. For example, if analysis of a user's usage pattern indicates the user watches a lot of sports programming, the user may be interested in subscribing to a premium sports channel, or to subscribe to a premium sports package. Along similar lines, if the analysis in block 402 indicates that a user has attempted to access an unavailable channel multiple times, one or more packages that include the channel might be recommended to the user.

Figure 5:
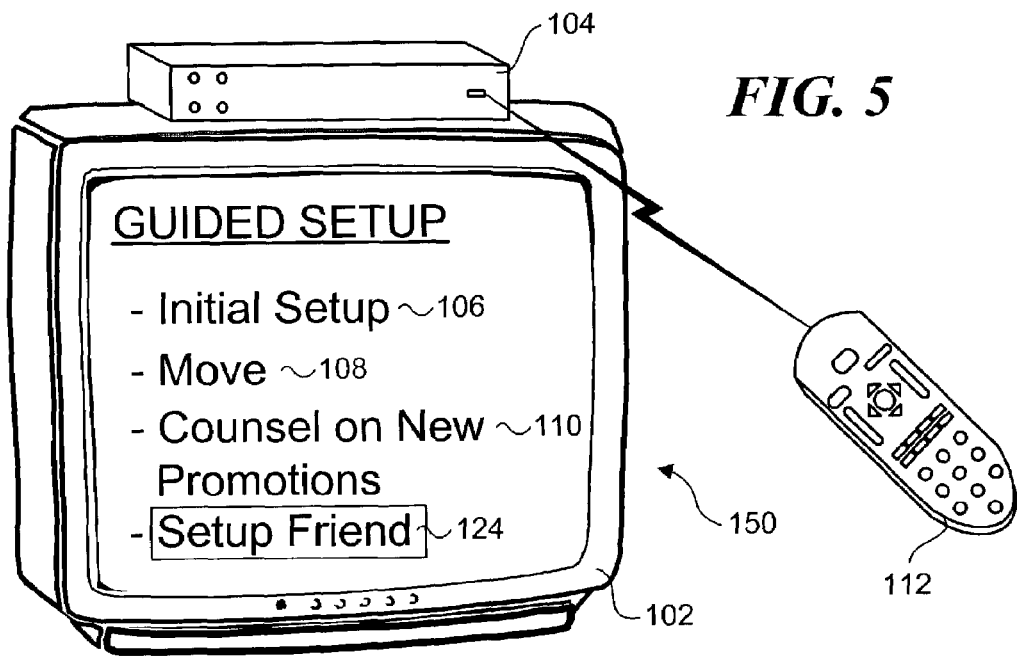
FIG. 5 is a representation of a display window corresponding to an interactive screen from which a user may select an option to enable a visiting friend to initiate setting up a subscription to a programming package that is currently being used at the location the friend is visiting.

A setup screen 150 including a "Setup Friend" option 124 that may be selected for initiating a process by which a visitor user (visitor) is assisted in setting up a service similar to that used by another customer, such as a friend or family member the user is visiting, is shown in FIG. 5. In one embodiment, selection of "Setup Friend" option 124 initiates a process described with reference to the flowchart of FIG. 6, wherein various activities are performed at different locations, including at a friend's (customer's) set-top box 500A, at a service provider service center 519, and at a visitor's home set-top box 500B. In this context, the visitor is a person who is visiting the home of another customer of a common service provider, such as a friend or family member. The visitor observes that the friend or family member has a TV programming package that provided enhanced programming when compared with the visitor's current package, and would like to subscribe to the same package. Rather than require the visitor to write down or remember specific package information and call the service provider's call center to activate a subscription for this programming package, embodiments of the invention facilitate subscription to the desired service in a manner that requires much less work. Furthermore, these embodiments may further be configured to support a mechanism to reward the friend or family member for providing a referral to the visitor, thereby providing an incentive to use the feature.

Figure 6:
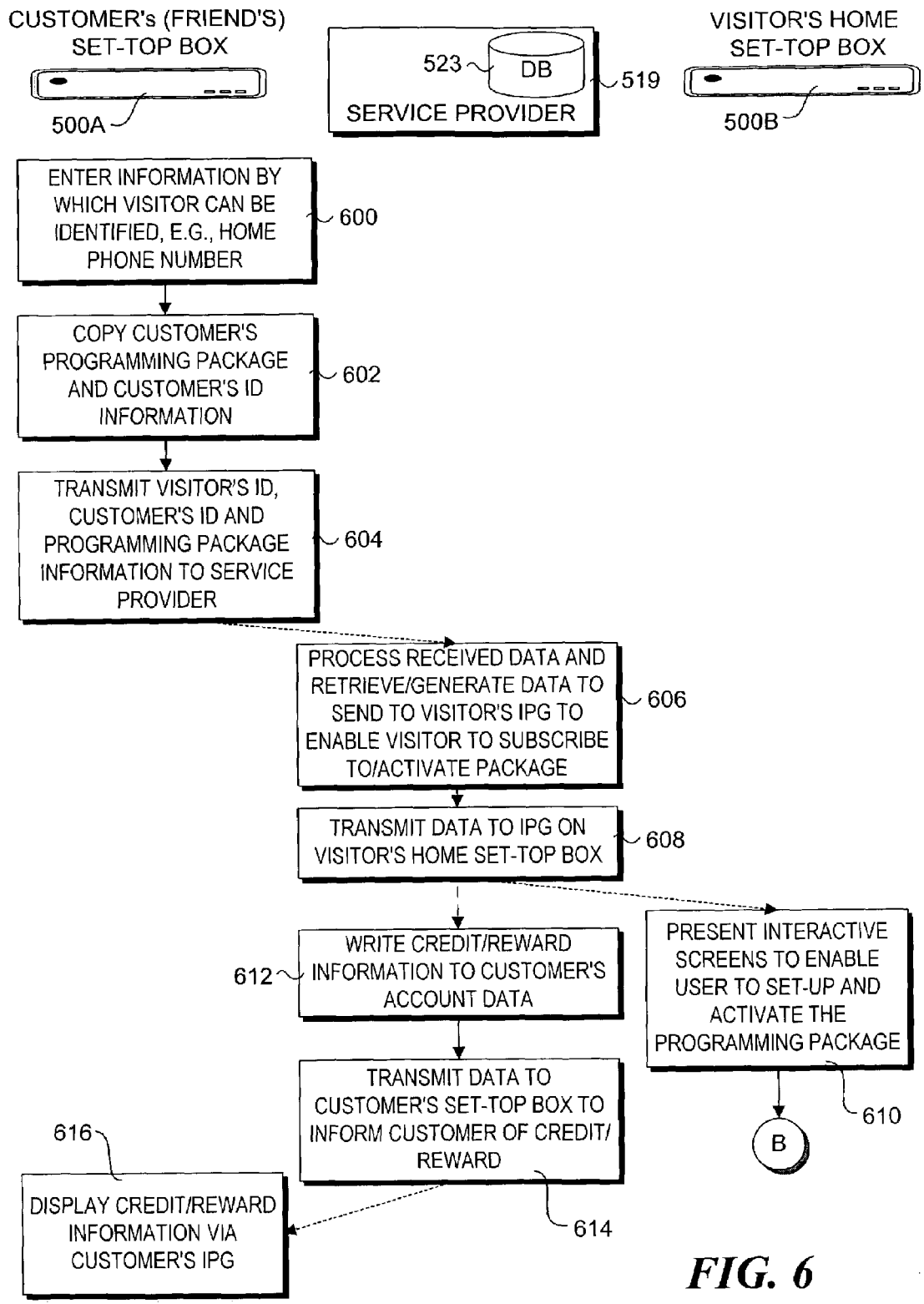
FIG. 6 is a flow diagram corresponding to a first embodiment of a method that enables the visiting friend to setup and activate the programming package.
Figure 8:
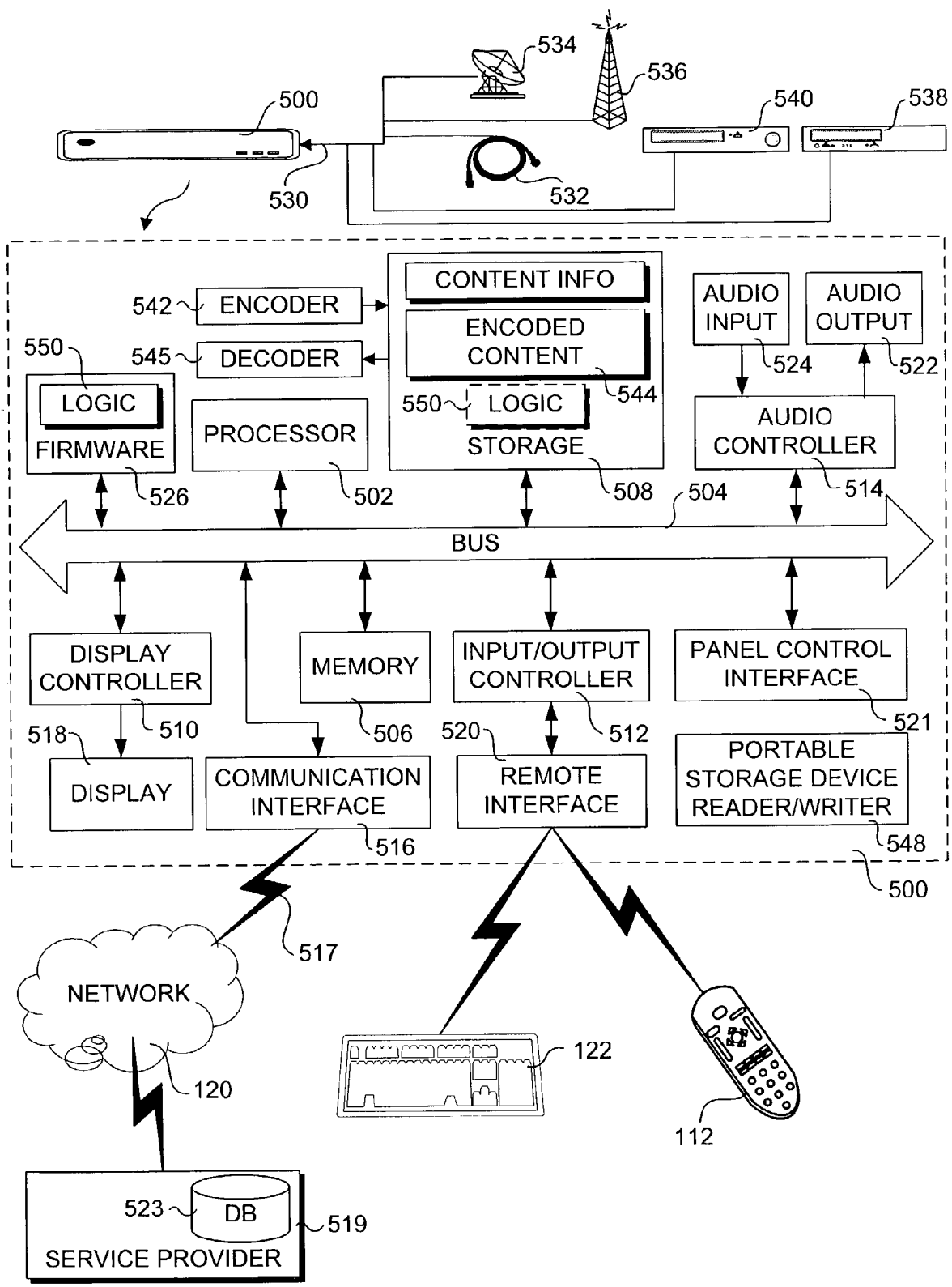
FIG. 8 is a schematic block diagram illustrating various components in a machine that may be used to implement the operations of various embodiments of the invention described herein.

The process of FIG. 6 begins in a block 600, wherein a visitor enters information on the customer's (i.e., friend or family member's) set-top box 500A that may be used by the service provider to identify the visitor. For example, a unique identifier, such as a phone number or address could be used. In a block 602, information identifying the customer's programming package is copied or otherwise retrieved. This information will be used by the service provider to uniquely identify the programming package to which the customer currently subscribes. Accordingly, this information may comprise a package identifier or a list of channels provided with the package, in cases where the user subscribes to a package that includes one or more user-selectable channels. The programming package may also be uniquely identified by passing customer identification to the service provider, whereby the service provider may identify the package by retrieving it from a database using a query that employs the customer identification. In this instance, the programming package identification would merely comprise the customer identification. Optionally, both programming package identification and customer identification information may be copied or retrieved. In a block 604, the visitor's ID, programming package information, and optional customer ID are transferred to the service provider at service provider service center 519. As described below, this information will typically be sent via a "back-channel" communication link between the set-top box and the service provider's service center, although a bi-directional primary channel (e.g., a channel used to receive broadcast information) may be used as well.

Upon receiving the data in a block 606, the service provider processes it to identify the visitor and programming package, and then retrieves or generates data to send to the interactive programming guide (IPG) running on visitor's home set-top box 500b to enable the visitor to subscribe to the package. The data are then transmitted to the IPG in a block 608, either over the back channel link or using a primary channel. Upon receiving the data at the visitor's set-top box, the IPG presents interactive screens to the visitor to easily enable the visitor to subscribe to and activate the programming package, as depicted by a block 610. For example, a screen could be configured to provide an option for the user to subscribe to the programming package, wherein the navigation point of the screen would correspond to the point identified by the encircled "B" in the flowchart of FIG. 2. At this point, the user would be able to perform and further set-up operations in a manner similar to that described above.

Typically, the data that are sent to the visitor's set-top box to enable the IPG to generate the interactive screens may comprise a script, a script identifier, navigation identifier, or a special access code. In the case of a script, the script will be processed by the IPG to cause the IPG to generate appropriate interactive screens defined by the script. In the case of a script identifier, a corresponding script would already be stored on the set-top box and would be run by the IPG. A navigation identifier is similar to a script identifier, but specifies a navigation point within a set of interactive screens rather than a script that is used to generate the screens. In the case of a special access code, the user would select to activate the special access code, whereby an interactive session with the service provider would be established, and the user would be able to subscribe to the package via a set of interactive screens that are generated, in part, based on data that are transmitted by the service provider during the session, somewhat akin to a client-server operation.

As described above, in one embodiment the scheme also enables the friend user to be rewarded for referring the visitor user to the programming package. For example, the reward might be used to credit the referring friend user's account, or to provide other types of compensation to the friend user, such as one or more months of free enhanced services (e.g., a free premium channel, free pay-per-view event, etc.), or a free or discounted service offered by a service provider partner. Accordingly, in a block 612, the credit or reward information is written to the referring customer's account data in a block 612, as depicted by a database 523. In a block 614, data is transmitted to the referring customer's set-top box (IPG) to inform the customer of his credit or reward, whereupon such information is displayed on the customer's set-top box via the IPG upon being received in a block 616.

Figure 7:
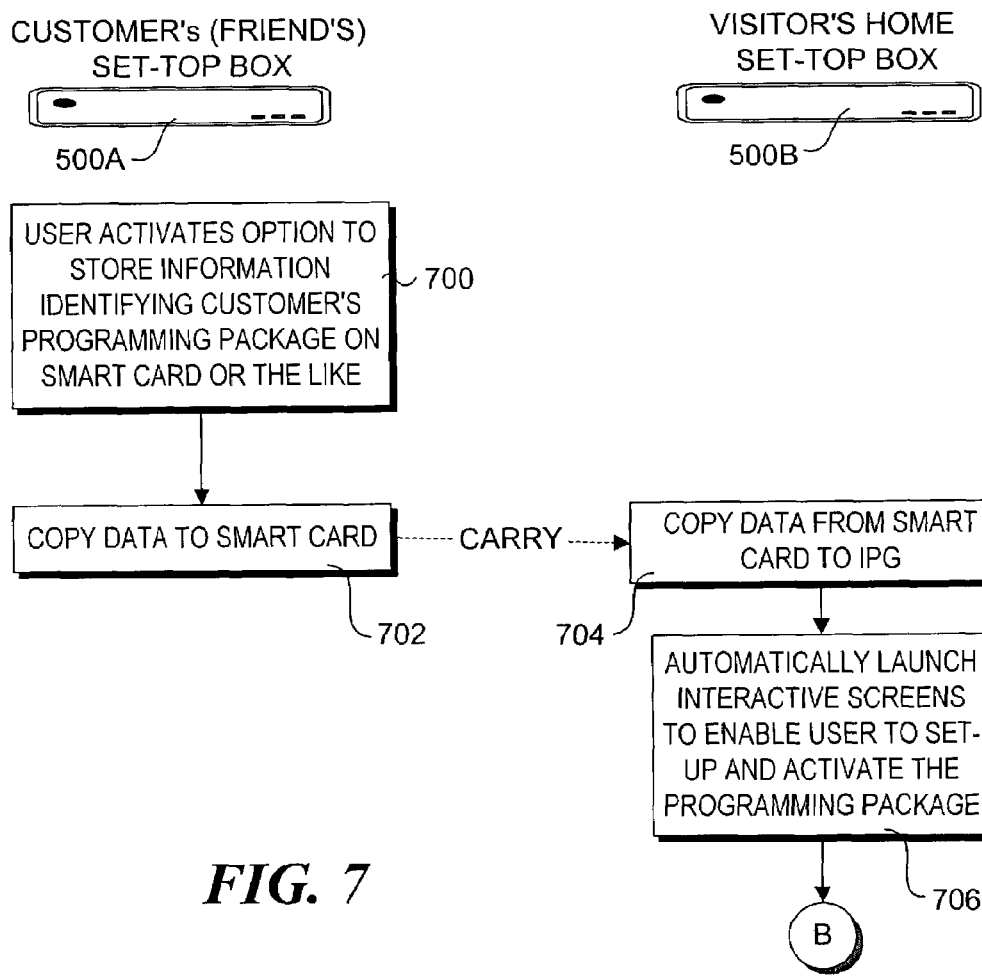
FIG. 7 is a flow diagram corresponding to a second embodiment of a method that enables the visiting friend to setup and activate the programming package.

A flowchart corresponding to a second embodiment of the programming package transfer package is shown in FIG. 7. In this case, the user activates an option to store information identifying the customer's programming package on a smart card or other portable storage means. Whatever storage means is used, it is assumed that both set-top boxes 500A and 500B provide an interface for using the portable storage means. The data are then copied to the portable storage means in a block 702. The visitor then carries the portable storage means home, and inserts it into his set-top box, whereupon the data are copied by the IPG running on the visitor's machine. The IPG then processes the data and launches interactive screens to enable the user to set-up and activate the programming package.

In an optional implementation, this embodiment may also be used to reward referring customers in a manner similar to that described above. In this instance, customer referral data (e.g., customer ID and information identifying referred pro-gramming package) would be sent to the service provider via the IPG. The operations of blocks 612, 614, and 616 would then be performed.

Exemplary Machine for Implementing Embodiments of the Invention

A schematic block diagram illustrating various components and operations of an exemplary machine 500 for implementing the embodiments of the invention discussed above is shown in FIG. 5. Generally, machine 500 is representative of "set-top" boxes that are used to access video and audio content provided by cable and satellite broadcast service providers. Generally, machine 500 will include one or more processors 502 coupled to a bus 504. The machine will also generally include memory 506, storage 508, a display controller 510, an input/output controller 512 and an audio controller 514, each of which is also coupled to bus 504.

In one embodiment, machine 500 interfaces to external systems and networks through a communications interface 516. Communications interface 516 may include a radio transceiver compatible with AM, FM, TV, digital TV, DVB, wireless telephone signals or the like. Communications interface 516 may also include an analog modem, Integrated Services Digital Network (ISDN) modem, cable modem, Digital Subscriber Line (DSL) modem, a T-1 line interface, a T-3 line interface, an optical carrier interface (e.g. OC-3), token ring interface, satellite transmission interface, a wireless interface or other interfaces for coupling a device to other devices.

Communications links facilitated by communications interface 516 are commonly referred to as back-channel links. Alternatively, or in addition to this link, communication between machine 500 and service provider service center 519 may be facilitated by a bi-directional link facilitated by the input signal medium. For example, a service provider that broadcasts content over a cable network may provide equipment to facilitate bi-direction use of the cable network, thereby allowing data to be transmitted by machines connected to the cable network to be received by the service provider. Of course, in order to implement this scheme, an appropriate communication interface must be provided by machine 500, such as a cable modem (not shown). This type of communications link is referred to herein as a primary channel bi-directional link.

In one embodiment, a carrier wave signal 515 is received by communications interface 516 to communicate with a network 517. Also connected to the network are one or more service providers service centers 519. In general, the machine may establish a communications link with a service provider (via its service center) in order to register a new service, enter or select scheduling information, save and retrieve customer account data, perform set-up operations, etc. The communications link may also enable the set-top box to query programming packages and the like (as discussed above with reference to block 304), which are stored in database 523. In one embodiment, carrier wave signal 515 is considered to be machine readable media, which may be transmitted through wires, cables, optical fibers or through the atmosphere, or the like.

In one embodiment, processor 502 may be a conventional microprocessor, such as for example but not limited to an Intel x86 or Pentium family microprocessor, a Motorola family microprocessor, or the like. Optionally, the processor may comprise a micro-controller, or the like. Memory 506 may be a machine-readable medium such as dynamic random access memory (DRAM) and may include static random access memory (SRAM). Display controller 510 controls in a conventional manner a display 518, which in one embodiment may be a cathode ray tube (CRT), a liquid crystal display (LCD), an active matrix display, a television monitor or the like. In one embodiment, a remote interface 520 is provided to support interaction with remote input devices, such as remote control 112 and a remote keyboard 122. Other remote input devices may also be used. Wired input devices may also be supported as well. A panel control interface 521 may also be provided to enable user input from a user input panel or the like provided by the machine.

In one embodiment, audio controller 514 controls in a conventional manner audio output 522, which may include, audio speakers, headphones, an audio receiver, amplifier or the like. In one embodiment, the audio controller also controls in a conventional manner audio input 524, which may include a microphone or input(s) from an audio or musical device, or the like.

Storage 508 in one embodiment may include machine-readable media such as, for example, but not limited to a magnetic hard disk, an optical disk, a read-only memory (ROM) component, a smart card or another form of storage for data. In one embodiment, storage 508 may include removable media, read-only media, readable/writeable media or the like. Some of the data may be written by a direct memory access process into memory 506 during execution of software in machine 500. It is appreciated that software may reside in storage 508, memory 506 or may be transmitted or received via modem or communications interface 516. Optionally, all or a portion of the software may be stored in a firmware storage device 526. For the purposes of this specification, the term "machine-readable media" shall be taken to include any media that is capable of storing data, information or encoding a sequence of instructions for execution by processor 502 to cause machine 500 to perform the operations of the embodiments of the invention discussed above. The term "machine-readable media" shall be taken to include, but is not limited to solid-state memories, optical and magnetic disks, carrier wave signals, and the like.

In some configurations, machine 500 may include personal video recorder (PVR) or digital video recorder (DVR) functionality, wherein the machine will be used to store content corresponding to movies, television shows, and the like. Typically, the content will be initially received as an audio/video (A/V) input signal 530. The A/V input signal may originate from one or more sources, including a cable broadcast 532, a satellite broadcast 534, or a local television broadcast 536. The A/V input signal may also be provided by a playback device, such as a DVD player 538 or VCR 540. It will be appreciated that other content input devices may be used as well, such as computers and the like.

Typically, upon receiving A/V signal 530, the signal will either be used for storing content, and/or passed through for display purposes. In cases in which the content is to be stored, the A/V signal will usually be encoded by an encoder 542 and stored as encoded content 544 in storage 508. A decoder 545 is used to decode the encoded content during playback operations. The encoding and decoding operations may be provided by embedded components (e.g., MPEG encoders and decoders), by processor 502, or a combination of the two. In addition to storing encoded content, storage 508 may be used to store corresponding content information 546, such as recording directories and the like. Content information 546 is used to also represent the various control access-related tables described herein (i.e., the system database).

For embodiments that employ the use of portable storage devices, such as smart cards and the like, machine 500 further includes a portable storage device reader/writer 548. Generally, this device may comprise any device that can write and read data stored on a portable storage medium, such as a magnetic or optical medium. For example, portable storage device reader/writer 548 may include, but is not limited to smart card readers/writers, CD-ROM drives, floppy drives, zip drives, etc.

In general, the operations of the embodiments described above will be implemented by executing software code stored in one or more software modules. Collectively, this software code is represented as logic 550. As shown, logic 550 may be stored in firmware device 526 and/or storage 508. Logic 550 also represents common set-top box applications, such as recording applications and electronic program guides and the like. In some instances, logic 550 may be updated via a download, which may be received via a primary connection (e.g., a cable input), or via a back-channel connection (e.g., an internet connection routed over telecom equipment). Accordingly, in one embodiment firmware device 526 comprises a rewriteable component, such as flash memory.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. A method comprising:
    generating, via a first set-top box associated with a first user, a user-interface configured to receive user identification information of a second user; and
    sending data including the user identification information and programming package identification information of a programming package included in the first user's subscription to a service provider,
    wherein the sent data is configured to cause the service provider to transmit a signal to a second set-top box associated with the second user, the signal configured to allow the second user to subscribe to the programming package.

2. The method of claim 1, wherein the programming package identification information comprises a unique programming package identifier.

3. The method of claim 1, wherein the programming package identification information comprises information by which the first user can be identified by the service provider, the method further comprising querying a database that links users with programming packages to which the users subscribe to identify the programming package.

4. The method of claim 1, wherein the service provider employs a referral compensation scheme in which the first user is compensated when the second user subscribes to the programming package via a process initiated at the first set-top box, the method further comprising:
    determining an identity of the first user; and
    storing data in a service provider's database identifying compensation the first user is to receive for referring the second user to the service provider.

5. The method of claim 4, further comprising receiving data at the first set-top box, the data configured to generate a user-interface via the first set-top box containing information identifying the compensation.

6. The method of claim 1, wherein the signal sent to the second set-top box is configured to generate a user-interface at the second set-top box and wherein the signal includes at least one of a script, script identifier, and user-interface navigation identifier.

7. The method of claim 1, wherein the signal sent to the second set-top box is configured to generate a user-interface at the second set-top box, wherein the signal includes interactive user-interface generation data that enables an interactive user-interface to be generated through interaction between a server operated by the service provider and the home set-top box in a client-server like manner.

8. A method for subscribing to a programming package comprising:

receiving a request for programming package identification information of a programming package included in a first user's subscription with a service provider; and in response to the request, storing the programming package identification information on a portable storage medium via a first set-top box associated with the first user, wherein the portable storage medium is readable by a second set-top box to retrieve the information, and wherein the programming package identification information is configured to generate a user-interface, via the second set-top box associated with a second user, through which the second user is able to subscribe to the programming package.

9. The method of claim 8, wherein the programming package identification information comprises a unique programming package identifier.

10. The method of claim 8, wherein the programming package identification information comprises identification information by which the first user can be identified by the service provider, the method further comprising querying a database that links users with programming packages to which the users subscribe to identify the programming package.

11. The method of claim 8, wherein the service provider employs a referral compensation scheme in which the first user is compensated when the second user subscribes to the programming package via a process initiated at the first set-top box, the method further comprising:

storing information by which the first user may be identified on the portable storage medium via the first set-top box;

retrieving the information by which the first user may be identified via the second set-top box;

sending the information by which the first user may be identified from the second set-top box to the service provider; and storing data in a service provider's database identifying compensation the first user is to receive for referring the second user to the service provider.

12. The method of claim 8, wherein the user-interface is generated by performing the operations of:

sending the programming package identification information to the service provider;

receiving one of a script, script identifier, and user-interface navigation identifier from the service provider; and generating the user-interface based on said one of the script, the script identifier and the user-interface navigation identifier.

13. The method of claim 8, wherein the user-interface is generated by:

sending the programming package identification information to the service provider; and establishing an interactive session between the service provider and the second set-top box, whereby the service provider sends interactive user-interface generation data to the set-top box via which an interactive user-interface may be generated to enable the second user to subscribe to the programming package.

14. The method of claim 8, wherein the portable storage medium comprises flash memory.

15. One or more machine readable storage media storing machine readable instructions that, when executed by a processor, cause the processor to perform a method comprising:

generating, at a first set-top box associated with a first user, a user-interface configured to receive user identification information of a second user; and sending data including the user identification information of the second user and programming package identification information of a programming package included in the first user's subscription to a service provider, wherein the sent data is configured to cause the service provider to transmit a signal to a second set-top box associated with the second user, the signal configured to allow the second user to subscribe to the programming package.

16. The one or more machine readable storage media of claim 15, wherein programming package information comprises a unique programming package identifier.

17. The one or more machine readable storage media of claim 15, wherein the signal is configured to generate a user-interface via the second set-top box and wherein the signal comprises one of a script, script identifier, and a user-interface navigation identifier.

18. One or more machine readable storage media storing machine readable instructions that, when executed by a processor, cause the processor to perform a method comprising:

receiving a request for programming package identification information of a programming package included in a first user's subscription with a service provider; and in response to the request, storing the programming package identification information on a portable storage medium via a first set-top box associated with the first user, wherein the portable storage medium is readable by a second set-top box to retrieve the information, and wherein the programming package identification information is configured to generate a user-interface, via the second set-top box associated with a second user, through which the second user is able to subscribe to the programming package.

19. The one or more machine readable storage media of claim 18, wherein the service provider employs a referral compensation scheme in which the first user is compensated when the second user subscribes to the programming package.

20. The one or more machine readable storage media of claim 19, further comprising instructions for:

storing information by which the first user can be identified on the portable storage medium, wherein the information by which the first user can be identified is retrievable by the second set-top box and wherein the information is configured to be sent to the service provider.

21. An apparatus comprising:

a processor; and memory configured to computer readable instructions that, when executed by the processor, cause the apparatus to perform a method comprising:

receiving user identification information of a second user; and sending data including the user identification information of the second user and programming package identification information of a programming package included in a first user's subscription to a service provider, wherein the sent data is configured to cause the service provider to transmit a signal to a second device associated with the second user, the signal configured to allow the second user to subscribe to the programming package via the second device.

22. The apparatus of claim 21, wherein the user identification information of the second user is received through a user interface generated by the apparatus.

23. The apparatus of claim 21, wherein the signal includes user interface generation data for generating a user interface through which the second user is able to subscribe to the programming package.

24. An apparatus comprising:

a processor; and memory configured to store computer readable instructions that, when executed, cause the processor to perform a method comprising:

receiving a request for programming package identification information of a programming package included in a first user's subscription with a service provider; and in response to the request, storing the programming package identification information on a portable storage medium, wherein the portable storage medium is readable by a device different from the apparatus to retrieve the information, and wherein the programming package identification information is configured to generate a user-interface, via the device associated with a second user, through which the second user is able to subscribe to the programming package.

25. The apparatus of claim 24, wherein the device comprises a set-top box.

26. The apparatus of claim 24, wherein portable storage medium comprises at least one of an optical storage disk, a magnetic storage disk and a flash memory device.

\* \* \* \* \*